United States Patent
Emori

(10) Patent No.: US 9,288,438 B2
(45) Date of Patent: Mar. 15, 2016

(54) COMMUNICATION CONTROL SYSTEM AND CONTROL DEVICE

(71) Applicant: Mototsugu Emori, Saitama (JP)

(72) Inventor: Mototsugu Emori, Saitama (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/377,196

(22) PCT Filed: Mar. 7, 2013

(86) PCT No.: PCT/JP2013/057113
§ 371 (c)(1),
(2) Date: Aug. 7, 2014

(87) PCT Pub. No.: WO2013/137367
PCT Pub. Date: Sep. 19, 2013

(65) Prior Publication Data
US 2015/0035938 A1 Feb. 5, 2015

(30) Foreign Application Priority Data

Mar. 16, 2012 (JP) ................................ 2012-061247

(51) Int. Cl.
*H04N 7/15* (2006.01)
*H04M 3/56* (2006.01)
*H04L 12/18* (2006.01)

(52) U.S. Cl.
CPC .............. *H04N 7/15* (2013.01); *H04L 12/1827* (2013.01); *H04M 3/567* (2013.01)

(58) Field of Classification Search
CPC ...... H04N 7/15; H04L 12/1827; H04M 3/567
USPC ........ 348/14.03, 14.07, 14.08, 14.1; 704/246; 709/200, 204, 205, 206, 231; 715/233; 250/584; 358/1.15; 378/62, 98.7; 380/55
See application file for complete search history.

(56) References Cited

U.S. PATENT DOCUMENTS 5,448,739 A * 9/1995 Jacobson ............ G06F 9/45512
345/440
5,646,417 A * 7/1997 Dewaele ............... G01T 1/2012
250/584

(Continued)

FOREIGN PATENT DOCUMENTS

JP 2002-325239 11/2002
JP 2006-101522 4/2006

(Continued)

OTHER PUBLICATIONS

Extended European Search Report dated Dec. 11, 2014.

(Continued)

*Primary Examiner* — Gerald Gauthier
(74) *Attorney, Agent, or Firm* — IPUSA, PLLC

(57) ABSTRACT

A communication control system includes a first control device; a second control device, wherein the first control device and the second control device are grouped together by group identification information; a detecting unit configured to detect image data displayed on a display unit connected to the first control device; a first communication control unit configured to establish a session for performing data communication with the second control device identified by the group identification information, and send the image data; and a display control unit configured to implement control to display the image data sent from the first communication control unit.

9 Claims, 11 Drawing Sheets

(56) References Cited

U.S. PATENT DOCUMENTS

| | | | | |
|---|---|---|---|---|
| 5,652,776 | A | * | 7/1997 | Riet ............... G06F 17/25 250/369 |
| 6,144,991 | A | * | 11/2000 | England ....... G06F 17/30873 707/E17.111 |
| 6,151,619 | A | * | 11/2000 | Riddle ............ H04L 12/1822 709/204 |
| 6,415,312 | B1 | * | 7/2002 | Boivie ............. H04L 1/1803 370/351 |
| 6,480,570 | B1 | * | 11/2002 | Ikeda ................. A61B 6/06 378/98.2 |
| 6,675,197 | B1 | * | 1/2004 | Satoh ............. G06Q 10/107 709/204 |
| 7,733,514 | B2 | * | 6/2010 | Kano ............... G06F 3/1222 348/275 |
| 7,925,015 | B2 | * | 4/2011 | Yasui ............. G03G 15/5091 380/51 |
| 7,984,174 | B2 | * | 7/2011 | Rideout ........... H04L 12/1822 709/230 |
| 8,174,713 | B2 | * | 5/2012 | Yanagi ........... H04N 1/00209 358/1.15 |
| 8,269,815 | B2 | * | 9/2012 | Tsugane ............ H04N 7/147 348/14.08 |
| 8,570,578 | B2 | * | 10/2013 | Yoshida .......... H04N 1/00244 358/1.15 |
| 8,593,502 | B2 | * | 11/2013 | Saleh ............... G06F 3/041 348/14.03 |
| 8,630,854 | B2 | * | 1/2014 | Marvit ............. G10L 15/26 348/14.08 |
| 8,736,878 | B2 | * | 5/2014 | Grabkowitz .... H04N 1/00225 358/1.15 |
| 8,842,157 | B2 | * | 9/2014 | Wang ....................... 348/14.08 |
| 8,860,776 | B2 | * | 10/2014 | Long ............... H04L 12/1827 348/14.01 |
| 8,872,879 | B2 | * | 10/2014 | Saleh ............... G06F 3/041 348/14.08 |
| 8,909,704 | B2 | * | 12/2014 | Flannagan ....... H04L 12/1822 709/203 |
| 2002/0095465 | A1 | * | 7/2002 | Banks ............. H04L 12/1818 709/206 |
| 2006/0066717 | A1 | | 3/2006 | Miceli |
| 2008/0098295 | A1 | * | 4/2008 | Nelson ........... H04L 29/06027 715/233 |
| 2010/0097644 | A1 | * | 4/2010 | Takahashi ......... G06F 3/1204 358/1.15 |
| 2011/0271129 | A1 | | 11/2011 | Flannagan et al. |
| 2012/0032976 | A1 | | 2/2012 | Nagahara et al. |
| 2012/0050197 | A1 | | 3/2012 | Kemmochi |
| 2012/0062591 | A1 | | 3/2012 | Omura et al. |
| 2012/0206387 | A1 | | 8/2012 | Omura et al. |
| 2012/0235934 | A1 | | 9/2012 | Kawasaki et al. |
| 2013/0135263 | A1 | | 5/2013 | Omura |
| 2013/0135346 | A1 | | 5/2013 | Sakuramata et al. |
| 2015/0035938 | A1 | * | 2/2015 | Emori ................ H04M 3/567 348/14.08 |

FOREIGN PATENT DOCUMENTS

| | | |
|---|---|---|
| JP | 2009-071478 | 4/2009 |
| JP | 2009-230579 | 10/2009 |
| JP | 2010-256989 | 11/2010 |
| WO | 03/034235 | 4/2003 |

OTHER PUBLICATIONS

International Search Report mailed on Apr. 9, 2013.

* cited by examiner

COMMUNICATION CONTROL SYSTEM AND CONTROL DEVICE

TECHNICAL FIELD

The present invention relates to a communication control system and a control device.

BACKGROUND ART

As large-size displays of approximately 40 inches to 60 inches using a flat panel such as liquid crystal and plasma and a projector, so-called "interactive electronic whiteboard" products provided with a touch panel are available in the market. By connecting a personal computer (PC), these products can project an image displayed on the display unit of the PC, as an enlarged image. An interactive electronic whiteboard is used for presentations at conferences in companies and government agencies, and also in educational institutions.

For example, Patent Document 1 discloses a remote conference method of separately sharing stroke and an operation screen for the purpose of sharing the screen of a whiteboard with conference attendees at remote locations.

Furthermore, there is a "PC operation function via a touch panel", in which a touch panel function provided in the interactive electronic whiteboard is used instead of operating a mouse, to directly touch a screen on which an image is projected and operate the PC displaying the screen. Furthermore, electronic blackboard application software that is operated in a connected PC is provided together with the above devices. This application software provides a "handwriting function via a touch panel", such as a function of providing a screen acting as a blackboard and handwriting characters on the blackboard via a touch panel, and a function of acquiring a screen of a PC providing this application and superimposing handwritten characters on the screen.

By using an interactive electronic whiteboard having such a handwriting function, at a conference in an office, it is possible to directly write indicated items in a screen while operating displayed materials used for descriptions, and record the screen contents including the written in items according to need. As a result, when a conference ends, the screen contents can be immediately reviewed, and by reusing the screen contents, conclusions can be efficiently achieved.

Furthermore, in recent years, as networks are becoming high speed and cloud services are becoming popular, remote conferences are increasingly being held by using the above interactive electronic whiteboard. In these cases, by using existing remote conference software, the screen of a PC can be displayed on a display screen at a remote location, and the screen can be shared with attendees at the remote location. Accordingly, in addition to features of a conventional TV conference, items written onto a whiteboard and a projected screen of a PC can be shared with attendees at a remote location in a real-time manner. Thus, even though the conference is a remote conference, active discussions can be held like a face-to-face conference.

In a remote conference using an interactive electronic whiteboard having the above function, it is important to display the screen of a PC brought into the conference room on a display or by a projector; quickly display the image on a display screen at a remote location, and share the information in the screen with attendees at the remote location.

However, with the technology of Patent Document 1, it is difficult to simply and automatically share the PC brought into the conference room with attendees at a remote location without any preliminary preparations. Generally, in a remote conference using existing interactive electronic whiteboards, it is necessary to install exclusive-use software in the PC in advance, and connect both a USB (Universal Serial Bus) cable and a VGA (Video Graphics Array) cable. Therefore, it is very time-consuming to make this preparation. Furthermore, as the entire screen of the PC is shared, portions of the screen that do not need to be shared are shown in the display screen at the remote location.

These problems tend to arise when the interactive electronic whiteboard is used for educational purposes by a fixed person such as a teacher. When a stationary remote conference system is used, these problems may not arise as much. However, in a conference of a company, the conference room is used by different people every time. Furthermore, existing remote conference systems have not been able to address the needs of users who want to immediately start a conference with increased efficiency.

Patent Document 1: Japanese Laid-Open Patent Application No. 2009-230579

DISCLOSURE OF INVENTION

The present invention has been made in view of the above-described problems, and it is an object of at least one embodiment of the present invention to provide a communication control system and a control device by which image data displayed on a display unit of a device connected to a first control device can be simply and automatically displayed by a second control device connected to a network.

An aspect of the present invention provides a communication control system including a first control device; a second control device, wherein the first control device and the second control device are grouped together by group identification information; a detecting unit configured to detect image data displayed on a display unit connected to the first control device; a first communication control unit configured to establish a session for performing data communication with the second control device identified by the group identification information, and send the image data; and a display control unit configured to implement control to display the image data sent from the first communication control unit.

BEST MODE FOR CARRYING OUT THE INVENTION

Figure 1:
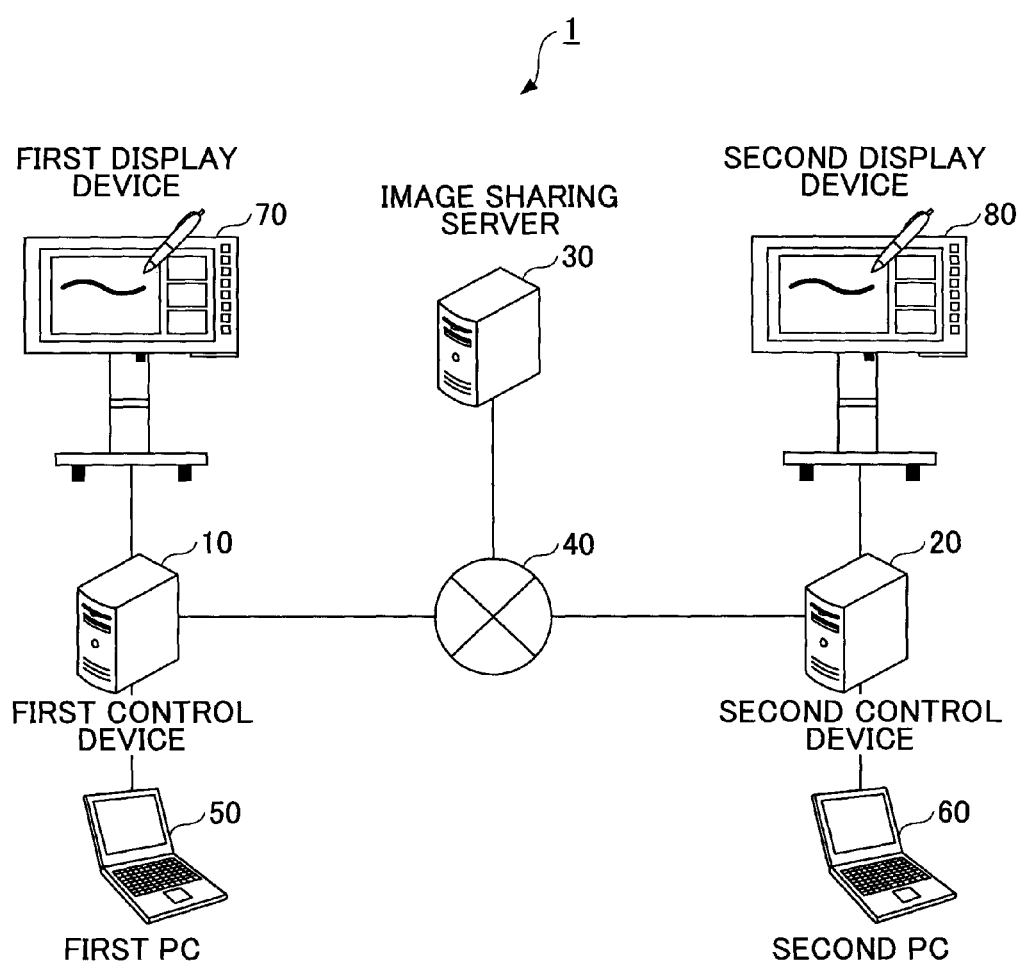
FIG. 1 illustrates the overall configuration of a communication control system according to one embodiment.

Embodiments of the present invention are described below with reference to the accompanying drawings. In the present specification and drawings, elements that have substantially the same function are denoted by the same reference numerals and overlapping descriptions are omitted.

In a communication control system according to one embodiment of the present invention, an interactive electronic whiteboard provided with a controller is prepared. When a laptop PC is connected to the controller, the controller recognizes this connection, and automatically starts sharing image information with a device at a remote location. Specifically, a controller is an example of the first and second control devices in FIG. 1, an interactive electronic whiteboard is an example of the first and second display devices in FIG. 1, a PC brought into the conference by a conference attendee (user) is an example of a first PC in FIG. 1, a PC brought into the conference room at a remote location by a conference attendee (user) at a remote location is an example of a second PC in FIG. 1.

An interactive electronic whiteboard provided with a controller is prepared in the conference room. When a laptop PC is connected to the controller, the controller recognizes this connection, and automatically starts sharing images with a particular device disposed at a remote location. The controller captures the screen of the laptop PC and sends the screen to the remote location.

As described above, in the communication control system according to the present embodiment, a controller of a remote conference system using an interactive electronic whiteboard automatically controls the operation of sharing image information with a particular device at a remote location. Accordingly, with the remote conference system using the interactive electronic whiteboard, attendees of the remote conference system can intuitively share the screen of the laptop PC. Details of the communication control system according to the present embodiment are given below.

Overall Configuration of Communication Control System

The overall configuration of the communication control system according to one embodiment of the present invention is described with reference to FIG. 1. FIG. 1 illustrates the overall configuration of the communication control system according to one embodiment of the present invention. In a communication control system 1 according to the present embodiment, a first control device 10, a second control device 20, and an image sharing server 30 are connected by a network 40.

The first control device 10 is connected to a first laptop PC 50 and a first display device 70. The first PC 50 is assumed to be a laptop PC that has been brought into the conference room by an attendee of the conference. When the first PC 50 is connected to the first control device 10, the screen of the first PC 50 is displayed on the first display device 70, which is used in the conference.

Meanwhile, the second control device 20 is installed at a location remote from the first control device 10. The second control device 20 is connected to a second laptop PC 60 and a second display device 80. The second PC 60 is assumed to be a laptop PC that has been brought into the conference room by an attendee of the conference.

The image sharing server 30 controls communications and the operation of sharing a screen between the first control device 10 and the second control device 20, and implements management so that the remote conference proceeds smoothly.

As a method of using the communication control system 1, the method of the remote conference system using the interactive electronic whiteboard described above may be used. The interactive electronic whiteboard according to the present embodiment includes a display and a controller. A display is an example of the first and second display devices in FIG. 1, and a controller is an example of the first and second control devices in FIG. 1. Usually, the controller acting as a control device is disposed on the back side of the display, and it appears as if the display and the controller are operating as a single body as viewed from the user.

When a touch panel display is used as the first display device 70 and the second display device 80, handwriting can be input on the touch surface of the first display device 70 and the second display device 80. A projector may be used as the first display device 70 and the second display device 80.

The first PC 50 and the second PC 60 connected to the first control device 10 and the second control device 20 are examples of devices connected to the first control device 10 and the second control device 20.

The first display device 70 and the second display device 80 and the first control device 10 and the second control device 20 are connected by a display cable, respectively. The screen of a device (a PC in this example) connected to the first control device 10 and the second control device 20 is displayed on the first display device 70 and the second display device 80, respectively. Furthermore, the first control device 10 and the second control device 20 are connected to the network 40, and can perform communications with other control devices and image sharing servers that are not shown. Furthermore, the first control device 10 and the second control device 20 have hardware such as an image input board, and receive input of images of a laptop PC connected by a VGA cable. The first control device 10 and the second control device 20 may display a screen of the laptop PC on the self-screen or may capture images of a screen of the laptop PC from the input image.

The first PC 50 and the second PC 60 only need to have functions of a typical laptop PC, and do not need to have other functions. This is because a PC brought into the conference room is most likely to be a laptop PC without any special functions.

In the present embodiment, a laptop PC is used as the device connected to the first control device 10 and the second control device 20. Other embodiments may use other electronic devices having a display unit to which image frames can be supplied, such as a desktop PC, a tablet PC, an information portable terminal PDA, a digital video camera, a digital camera, and a portable music player.

In the present embodiment, the left side as viewed in FIG. 1 is the side for sending image data of the first PC screen, and the right side as viewed in FIG. 1 is the side for receiving the image data of the first PC screen. When the right side is the sending side and the left side is the receiving side, the functions are merely reversed, and otherwise the configurations and operations are the same.

In the present embodiment, the device on the left side is described as the device on the sending side and the device on the right side is described as the device on the receiving side. However, each of the first control device 10 and the second control device 20 has a P2P type configuration such that either one can be the sending terminal or the receiving terminal. It is assumed that the information processing device with which one of the control devices can communicate may be the server, or may be another control device.

Function Configuration of Communication Control System

Figure 2:
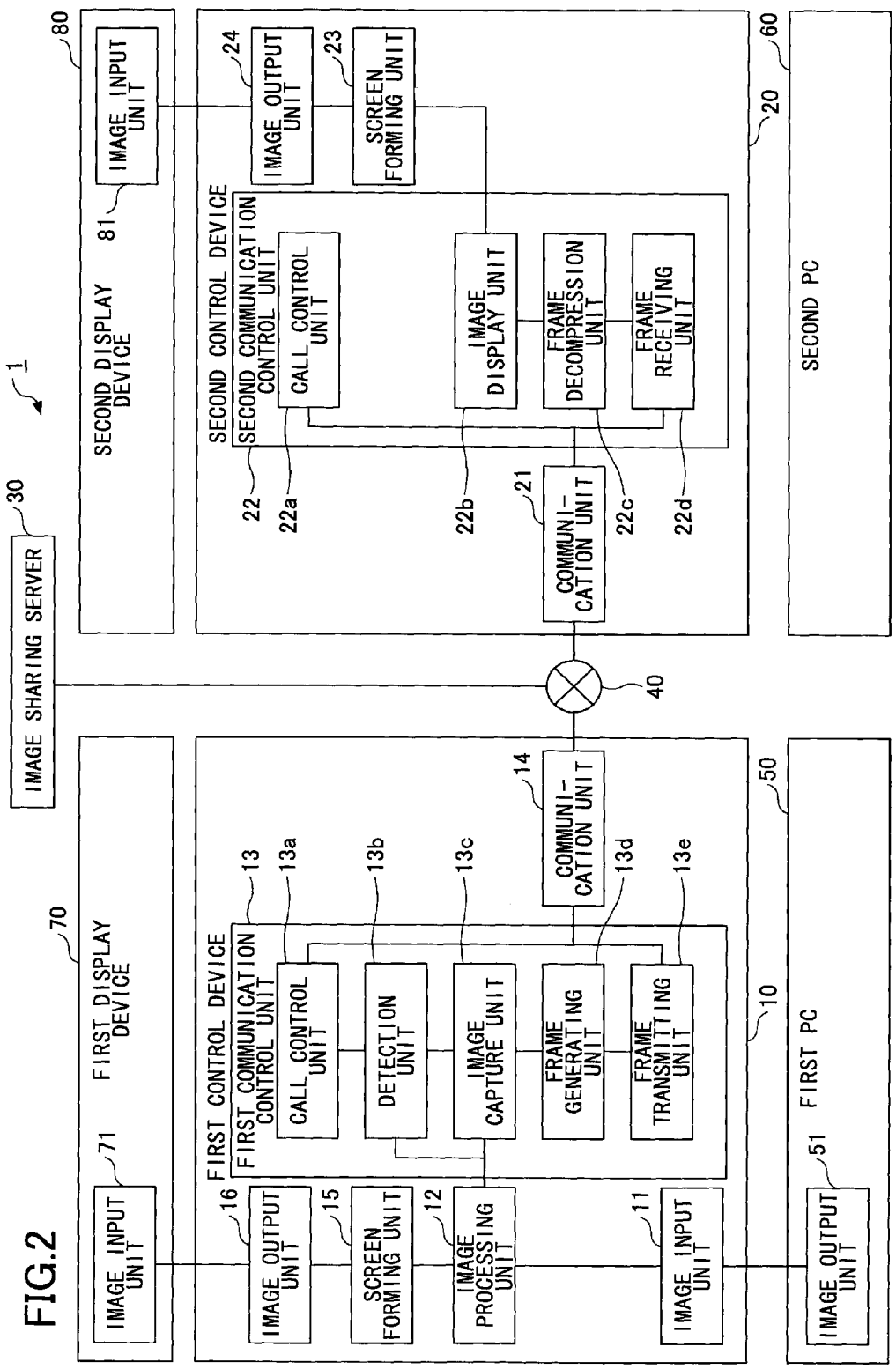
FIG. 2 is a functional block diagram of the communication control system according to one embodiment.
Figure 3:
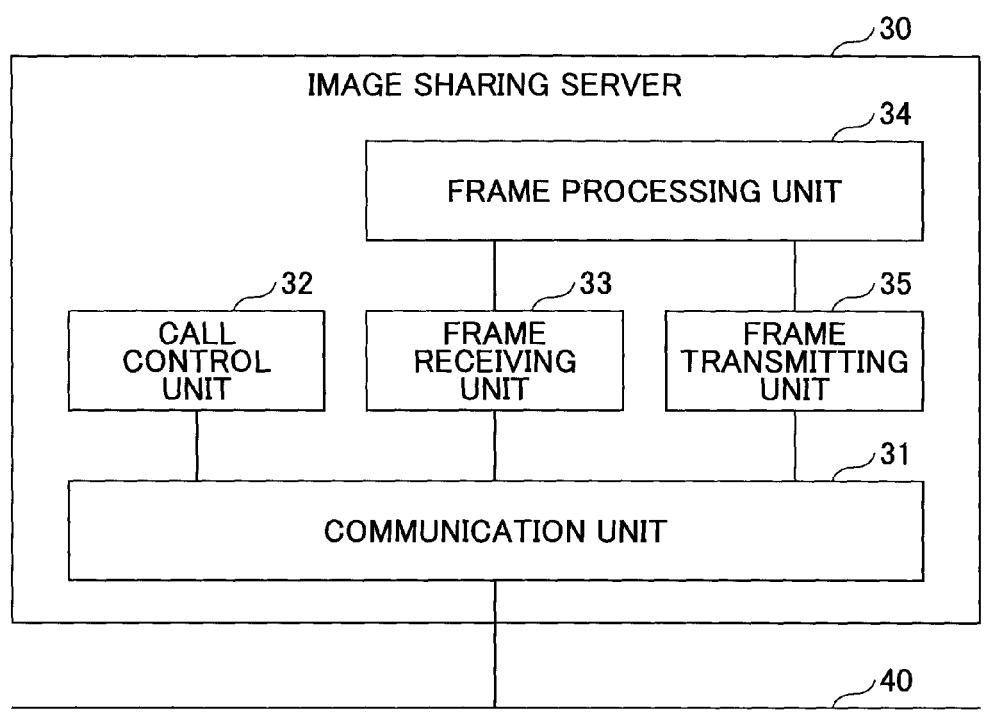
FIG. 3 is a functional block diagram of a server according to one embodiment.

Next, a description is given of functions of the communication control system according to the present embodiment, with reference to FIGS. 2 and 3. FIG. 2 is a functional block diagram of the first control device 10 and the second control device 20 included in the communication control system according to the present embodiment. FIG. 3 is a functional block diagram of the image sharing server 30 included in the communication control system according to the present embodiment.

Functional Configuration of First Control Device 10

First, a description is given of a functional configuration of the first control device 10 functioning as the sending side of images according to the present embodiment. The first PC 50 is constituted by an image output unit 51, etc., and when the first PC 50 is connected to the first control device 10 by a display cable such as a VGA cable, the image output unit 51 outputs a screen to the first control device 10.

The first control device 10 acquires image data displayed on the display unit (screen) of the first PC 50. The first control device 10 includes an image input unit 11, an image processing unit 12, a screen forming unit 15, an image output unit 16, a first communication control unit 13, and a communication unit 14.

The image input unit 11 receives an image output from the first PC 50, and the image processing unit 12 processes the received image data. The image processing unit 12 is an example of an image processing unit that acquires image data displayed on the display unit of a device and implements control to display the acquired image data. The image processing unit 12 displays the screen of the first PC 50 in an application window according to need.

The screen forming unit 15 executes the operation of displaying a screen in a window. The screen forming unit 15 is a module constituting the screen of the first control device 10, and a window manager of an OS corresponds to the screen forming unit 15. The screen of the first control device 10 is output to the first display device 70 by the image output unit 16. When the image processing unit 12 detects the connection of the first PC 50, the image processing unit 12 reports this to the first communication control unit 13. When the image processing unit 12 detects the acquisition of image data of the screen of the first PC 50, the image processing unit 12 also reports this to the first communication control unit 13.

The first communication control unit 13 includes a call control unit 13a, a detection unit 13b, an image capture unit 13c, a frame generating unit 13d, and a frame transmitting unit 13e. The detection unit 13b of the first communication control unit 13 receives a connection report that the first PC 50 has been connected, from the first control device 10. In response to this report, the call control unit 13a establishes a session for performing data communication with the image sharing server 30, to send an image shown on the screen of the first PC 50. When a session is established, the image capture unit 13c uses the functions of the image processing unit 12 to capture the screen of the first PC 50. The frame generating unit 13d generates a frame from the image as transmission data. The frame transmitting unit 13e uses the functions of the communication unit 14 to send a frame of the image generated in the image sharing server 30. The frame generating unit 13d may compress the acquired image data and generate a frame and use this frame as the transmission data. The image processing unit 12 and the detection unit 13b are examples of a detection unit having a function of detecting the connection of the first PC 50 and a function of detecting acquisition of image data displayed on the display unit of the first PC 50 connected to the first control device 10. The first display device 70 includes an image input unit 71, and inputs and displays the screen of the first PC 50.

Function Configuration of Second Control Device 20

Next, a description is given of a functional configuration of the second control device 20 functioning as the receiving side of images according to the present embodiment. The second control device 20 includes a communication unit 21, a second communication control unit 22, a screen forming unit 23, and an image output unit 24. The second communication control unit 22 includes a call control unit 22a, an image display unit 22b, a frame decompression unit 22c, and a frame receiving unit 22d.

When the image sharing server 30 makes a request to establish a session for receiving an image, the communication unit 21 receives this request, and the call control unit 22a establishes a session in response to this request. When the session is established, the frame receiving unit 22d receives a frame through the communication unit 21. The frame decompression unit 22c decompresses the received compressed frame to extract an image. The image display unit 22b displays this image in a window. The screen forming unit 23 forms an image to be displayed in a window based on the received image. The image data of the screen of the first PC 50 sent from the first control device 10 is output to the second display device 80 by the image output unit 24. The second display device 80 includes an image input unit 81, and inputs and displays image data from the second control device 20. The image output unit 24 is an example of a display control unit that implements control to display, on the second control device 20, image data that has been sent from the first control device 10 and received by the second communication control unit 22.

Function Configuration of Image Sharing Server

Next, a description is given of a function configuration of the image sharing server 30 according to the present embodiment. FIG. 3 is a functional block diagram of the image sharing server 30 according to the present embodiment.

The image sharing server 30 includes a communication unit 31, a call control unit 32, a frame receiving unit 33, a frame processing unit 34, and a frame transmitting unit 35. The call control unit 32 establishes a session with the second control device 20. In the case of a PC image transmission session, the frame receiving unit 33 receives the frame, and the frame is appropriately processed by the frame processing unit 34. When a PC image reception session is established, the appropriately processed frame is transferred to the second control device 20.

An example of an appropriate process on a frame is a process of converting the frame into a frame that is appropriate for being transferred, in consideration of the band and the delay between the image sharing server 30 and the second control device 20, the method of compressing the frame, and functions of the control devices. For example, when the transmitted image is a difference image, the frame processing unit 34 uses data of a previous frame to restore a regular image. Furthermore, when the band between the image sharing server 30 and the second control device 20 is narrow, and the resolution of the second control device 20 is low, the frame processing unit 34 reduces the size of the image included in the frame. The frame processing unit 34 may also change the direction of the image data according to the size and shape of the display on the receiving side.

The image sharing server 30 is particularly effective when there are plural second control devices 20 on the PC image receiving side. The reason being is that the first control device 10 on the PC image sending side needs to send the data only once.

The function of the call control unit 32 is an example of functions for executing a first session establishing unit for establishing a session for data communication with the first control device 10 and providing first session identification information to the session, and a second session establishing unit for establishing a session for data communication with the second control device 20 and providing second session identification information to the session.

The function of the frame receiving unit 33 is an example of a function for executing a receiving unit for receiving acquired image data sent from the first control device 10, when the first session to which first session identification information is given is established.

The function of the frame transmitting unit 35 is an example of a function for executing a transmitting unit for sending the acquired image data to the second control device 20, when the second session to which second session identification information is given is established.

The appropriate process performed at the frame processing unit 34 is an example of a function of a processing unit for converting the acquired image data with the use of predetermined image information. In this case, predetermined image information is image information such as a method of compressing a frame described above for converting the frame into a format to be displayed on the display device of the second control device 20, which is received by the above receiving unit. The transmitting unit sends, to the second control device 20, the image data that has been converted by the frame processing unit 34 based on the predetermined image information.

As described above, the first session establishing unit, the second session establishing unit, the transmitting unit, the receiving unit, and the processing unit may be executed by the image sharing server 30 as functions of the image sharing server 30 connected to the first control device 10 and the second control device 20 by the network 40.

The first session identification information given by the first session establishing unit and the second session identification information given by the second session establishing unit are IDs for identifying each of the sessions, and may be generated from random numbers every time a session is established.

The image sharing server 30 manages the session based on the session identification information given to each session. Furthermore, the image sharing server 30 stores in advance group identification information in which the first control device 10 and the second control device 20 are grouped together. Each of the first control device 10 and the second control device 20 may store group identification information in advance. The session identification information given to each session may not be generated for each session; the group identification information may be used as is as the session identification information. In the present embodiment, the first control device 10 and the second control device 20 are given a common conference ID in advance as the group identification information. Furthermore, in the present embodiment, the first session identification information and the second session identification information are generated and given as session IDs separately from the conference ID, each time a session is established.

Operations of First Control Device

Figure 4:
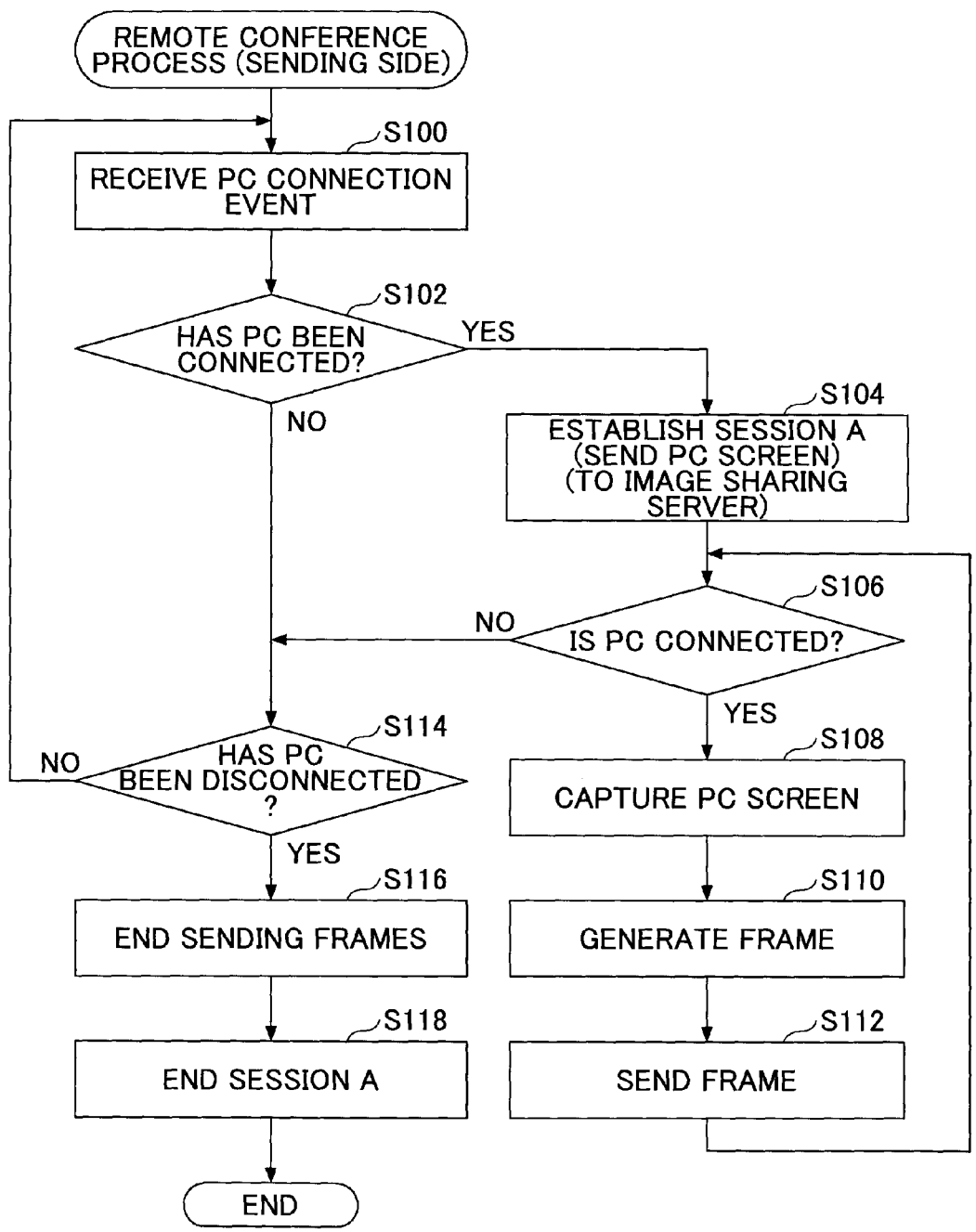
FIG. 4 is a flowchart indicating operations of a first control device according to one embodiment.

Next, a description is given of operations of the first control device according to the present embodiment, with reference to FIG. 4. FIG. 4 is a flowchart indicating operations of the first control device 10 according to the present embodiment. This is a process of the sending side of a remote conference process executed in the communication control system 1 according to the present embodiment.

When a remote conference is started, and the first PC 50 is connected to the first control device 10, the image data of the screen of the first PC 50 is automatically transferred to the image sharing server 30.

Specifically, the image processing unit 12 of the first control device 10 detects a PC connection event (connection event signal), and the first communication control unit 13 receives a PC connection event (step S100). The detection unit 13b determines that the first PC 50 has been connected at the timing of receiving this event (YES in step S102), and the call control unit 13a automatically establishes a PC screen transmission session (PC image transmission session A) with the image sharing server 30 (step S104). Then, the image capture unit 13c captures the image of the first PC 50 from the image processing unit 12 (step S108). Next, the frame generating unit 13d generates a frame as transmission data (step S110), and the frame transmitting unit 13e sends the frame (step S112).

Steps S108 through S112 are repeated as long as it is determined that the first PC 50 is connected (step S106), which are executed as an independent thread. Generating a frame means the operation of converting the captured PC screen (an image displayed on the screen of the first PC in this example) into a format appropriate for transmission. A frame includes information such as a frame number, the image size, and the compression format of the image; and the compressed image data. The image data is compressed by JPEG, PNG, etc., or by obtaining the difference between the present image data and the image data of a previous frame.

When a PC disconnection event (disconnection event signal) is received from the image processing unit 12, the detection unit 13b determines that the first PC 50 has been disconnected (steps S106, S114), and the frame transmitting unit 13e ends the transmission of the frame (step S116). The call control unit 13a ends the PC image transmission session A, and the present process is ended. When the first PC 50 is not disconnected in step S114, the process returns to step S100.

Operations of Second Control Device

Figure 5:
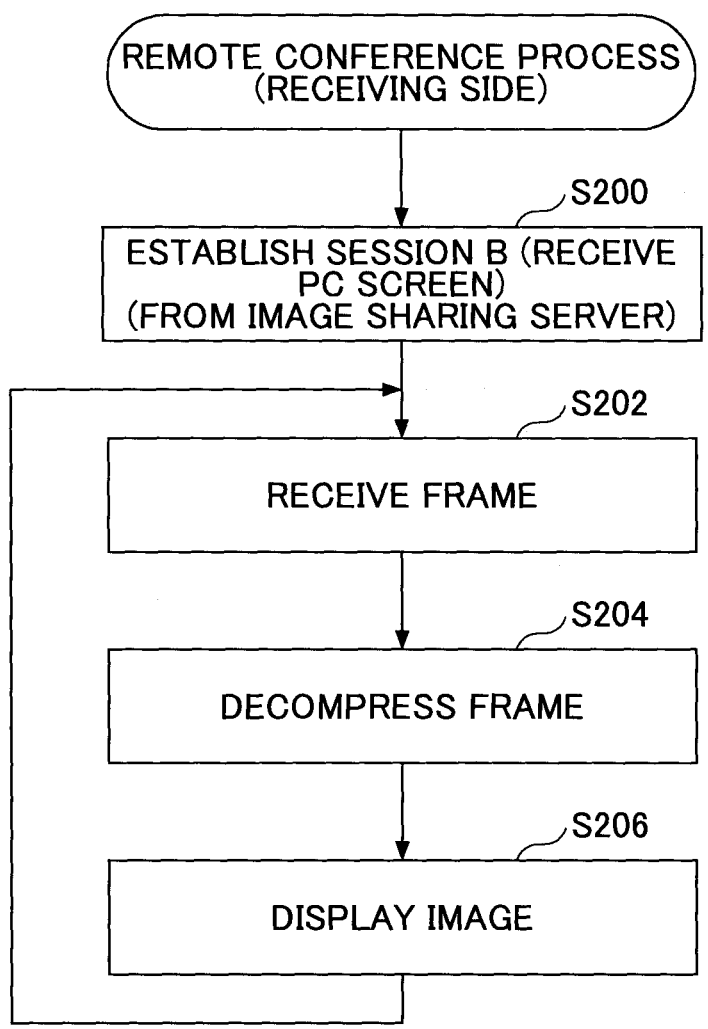
FIG. 5 is a flowchart indicating operations of a second control device according to one embodiment.

Next, a description is given of operations of the second control device according to the present embodiment, with reference to FIG. 5. FIG. 5 is a flowchart indicating operations of the second control device 20 according to the present embodiment. This is a process of the receiving side of a remote conference process executed in the communication control system 1 according to the present embodiment.

When a remote conference has started, the second control device 20 receives a request to establish a session from the image sharing server 30, receives the screen of the first PC 50, and displays the received screen.

Specifically, when the communication unit 21 of the second control device 20 receives a request to establish a PC screen reception session from the image sharing server 30, the second communication control unit 22 returns a response and a PC screen reception session (PC image reception session B) is established, and the PC image reception session B is started (step S200).

Next, the communication unit 21 of the second control device 20 receives a frame from the image sharing server 30 (step S202). The frame decompression unit 22c decompresses the received frame and extracts a PC image (step S204), and the screen forming unit 23 displays the PC image in a window (step S206). Accordingly, control is implemented so that the image displayed on the screen of the first PC 50 is displayed on the second display device 80. The frame receiving process is repeated until the session B ends or until the second PC 60 is connected to the second control device 20 and the session is changed to a PC screen transmission session is performed by the second control device 20. Examples of cases where the session B ends are when the image sharing server 30 requests to end the session B or a user requests to stop the remote conference.

Operations of Image Sharing Server 30

Figure 6:
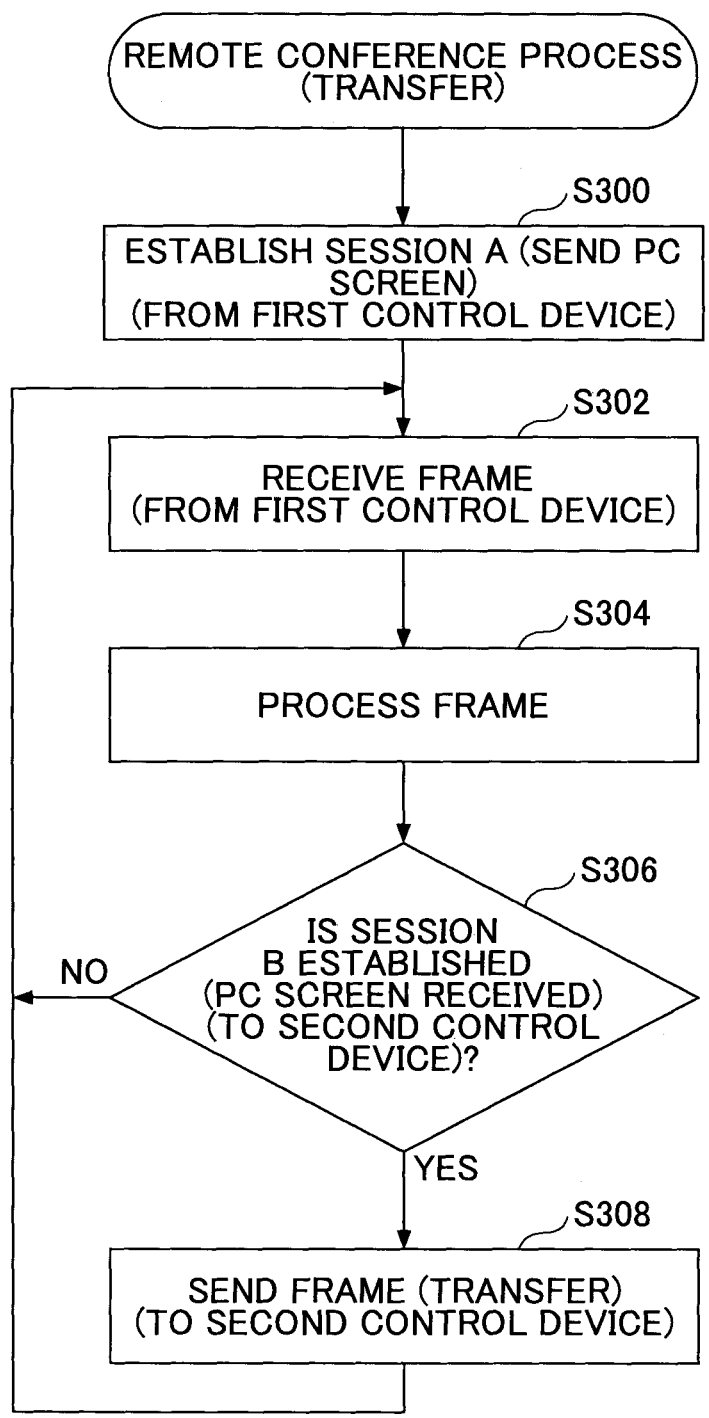
FIG. 6 is a flowchart indicating operations of a server according to one embodiment.

Next, a description is given of operations of the image sharing server 30 according to the present embodiment, with reference to FIG. 6. FIG. 6 is a flowchart indicating operations of the image sharing server 30 according to the present embodiment. In the present embodiment, this is a process of transferring the data received from the transmitting side to the receiving side, in the remote conference process.

When the call control unit 32 establishes the PC image transmission session A between the first control device 10 and the image sharing server 30 (step S300), the frame receiving unit 33 receives a frame from the first control device 10 (step S302). The frame processing unit 34 performs the above-described appropriate process on the frame (step S304).

Next, when the call control unit 32 determines that the PC image reception session B is established between the second control device 20 and the image sharing server 30 (step S306), the frame transmitting unit 35 transfers the frame that has undergone the appropriate process to the second control device 20 (step S308).

The appropriate process performed on the frame may be to restore an image from a previous image, if the image relevant to the frame is a difference image. The restored image is then compressed again by an appropriate method, and is sent to the second control device 20. When the image relevant to the frame is not a difference image, but the second control device 20 can only process images of a particular resolution, it is necessary to perform a process of reducing the image size. Furthermore, when the network band between the image sharing server 30 and the second control device 20 is narrow, it is necessary to perform processes for increasing the compression rate by reducing the image size or changing the compression format.

Sequence of Communication Control System

Figure 7:
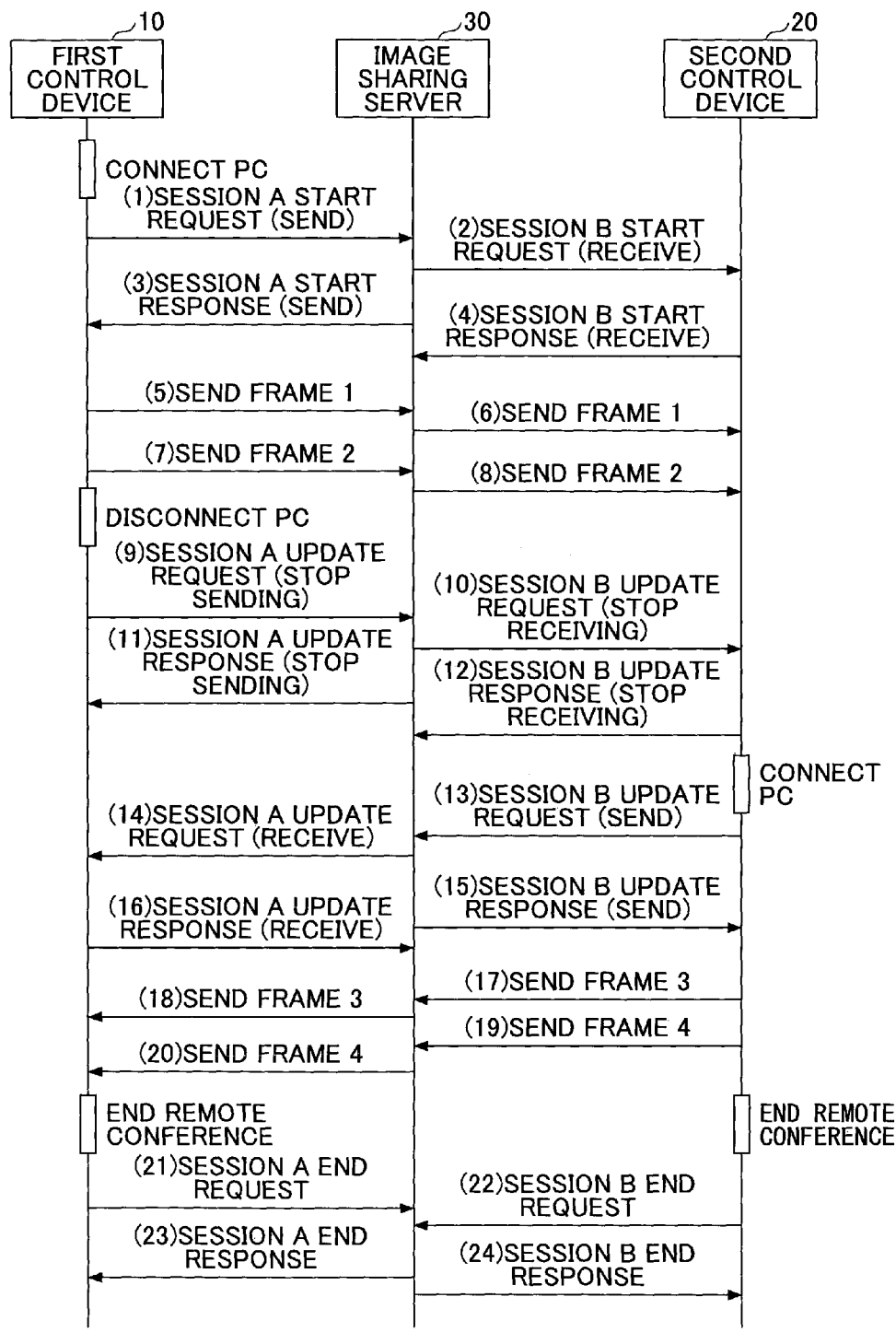
FIG. 7 is a sequence diagram of the communication control system according to one embodiment.

Next, a description is given of a sequence of the entire communication control system 1 according to the present embodiment with reference to FIG. 7. FIG. 7 is a sequence diagram illustrating communications performed among the first control device 10, the image sharing server 30, and the second control device 20.

Connection of Communication

First, a description is given of connecting a PC, establishing communication, and transmitting a frame (FIG. 7 (1) through (8)). When the first PC 50 is connected to the first control device 10, a session A is established between the first control device 10 and the image sharing server 30 (FIGS. 7 (1) and (3)), and frames 1 and 2 are sent (FIGS. 7 (5) and (7)).

When the image transmission session A is established, the image sharing server 30 establishes an image reception session B with the opposing second control device 20 (FIGS. 7 (2) and (4)), and transfers frames 1 and 2 (FIGS. 7 (6) and (8)).

In order to establish (update) a session, session information is exchanged among the first control device 10, the second control device 20, and the image sharing server 30. Session information indicates what has been sent by whom and how.

For example, when establishing an image transmission session A between the first control device 10 and the image sharing server 30, the session information indicates a session ID, a description that a PC image is sent by the first control device 10, and communication information such as the IP address and port number of the first control device 10. As the session ID, a remote conference ID is set, so that members of the same group can participate in the same remote conference.

Furthermore, when transferring a frame, the first control device 10, the second control device 20, and the image sharing server 30 establish communications and compress and decompress images based on session information of each session. That is to say, the first control device 10, the second control device 20, and the image sharing server 30 change their operations based on session information of each session.

Establishing Session A

When the first PC 50 is connected to the first control device 10, a session start request is sent from the first control device 10 to the image sharing server 30, and a session is established.

It is assumed that the IP address and the port number of the image sharing server 30 are reported to the first control device 10 and the second control device 20 in advance, and that the first control device 10 and the second control device 20 have a common remote conference ID. The first control device 10 and the second control device 20 need not have a common session ID. The first control device 10 and the second control device 20 may have a common session ID by setting the session ID to be the same value as a remote conference ID. As the method of setting a common ID, the ID may be set manually or a separate conference managing server may be used.

Specific Example

Figure 8:
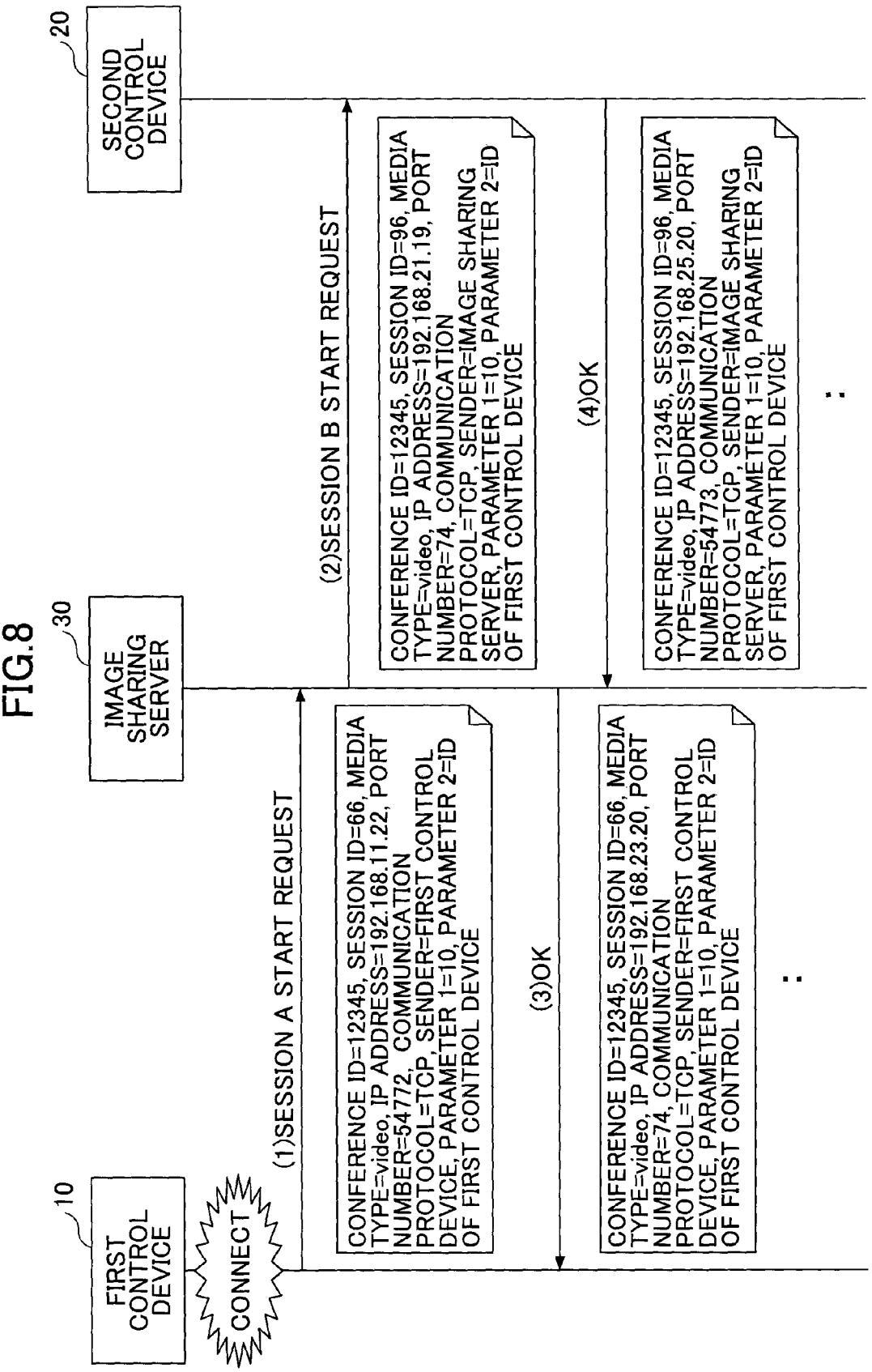
FIG. 8 is a sequence diagram of establishing a session in the communication control system according to one embodiment.

FIG. 8 illustrates session information that is passed among devices when establishing a session in the communication control system 1 according to the present embodiment. When the first PC 50 is connected to the first control device 10, a request to start a session A is automatically sent from the first control device 10 to the image sharing server (FIG. 8 (1)). At this time, a remote conference ID "12345" common to devices and set in advance is sent from the first control device 10 to the image sharing server 30. Accordingly, only the members belonging to the same group can participate in the remote conference. The remote conference ID is an example of group identification information for identifying whether a member belongs to the same group.

Furthermore, as a session ID, a value "66" generated from random numbers when this session is established, is sent. This value is identification information for identifying a session A. As described above, the session ID may be the same is the remote conference ID.

The other session information indicated in (FIG. 8 (1)) complies with the communication protocol of RFC 3261 or RFC 3264. When the information defines that "communication protocol=TCP, sender=first control device", it means that a device that can be identified by the first control device ID can communicate with the server based on the TCP protocol, and that the first control device sends data.

In response to the request to start a session at (FIG. 8 (1)), a response of starting a session (OK) is sent from the image sharing server 30 to the first control device 10 (FIG. 8 (3)). At this time also, the remote conference ID "12345" common to devices and set in advance and the session ID "66" are sent from the image sharing server 30 to the first control device 10.

Accordingly, it can be confirmed that a session is established so that members belonging to the same group can participate in the remote conference.

Similar to the case of (FIG. 8 (1)), the other session information at (FIG. 8 (3)) indicates that communication can be performed with a device that can be identified by the first control device ID based on the TCP protocol.

Establishing Session B

In response to the request to start the session A at (FIG. 8 (1)), a session B is established between the image sharing server 30 and the second control device 20. Specifically, a request to start the session B is sent from the image sharing server 30 to the second control device 20 (FIG. 8 (2)). At this time, a remote conference ID "12345" common to devices and set in advance is sent. Accordingly, only the members belonging to the same group can participate in the remote conference.

Furthermore, as a session ID, a value "96" generated from random numbers when this session is established, is sent. This value is identification information for identifying a session B. As described above, the session ID may be the same is the remote conference ID.

The other session information indicated in (FIG. 8 (2)) complies with the communication protocol of RFC 3261 or RFC 3264. When the information defines that "communication protocol=TCP, sender=image sharing server", it means that the server can communicate with a device that can be identified by the first control device ID based on the TCP protocol, and that the server sends data.

In response to the request to start a session at (FIG. 8 (2)), a response of starting a session B (sending OK) is sent from the second control device 20 to the image sharing server 30 (FIG. 8 (4)). At this time also, the remote conference ID "12345" and the session ID "96" are sent. Accordingly, it can be confirmed that a session is established so that members belonging to the same group can participate in the remote conference.

The other session information at (FIG. 8 (4)) indicates communication in a one way manner (only receiving) can be performed with a device that can be identified by the first control device ID based on the TCP protocol.

Disconnection of Communication

Next, a description is given of disconnection of a PC and updating of the communication. When the first PC 50 is disconnected from the first control device 10, the first control device 10 sends session information describing this as a session update request (FIG. 7 (9)). Before returning a response to the session update request, the image sharing server 30 sends the session update request to the second control device 20, and updates the session (FIG. 7 (10)). Accordingly, the second control device 20 stops receiving frames (FIG. 7 (12)). Meanwhile, when the first control device 10 receives a response, the first control device 10 stops sending frames (FIG. 7 (11)).

When the first PC 50 is connected to the second control device 20, the second control device 20 sends a session update request (FIG. 7 (13)), and the image sharing server 30 returns a session update response (FIG. 7 (15)). The image sharing server 30 sends the session update request to the first control device 10 (FIG. 7 (14)), and the first control device 10 returns a session update response (FIG. 7 (16)). Accordingly, a frame is sent from the second control device 20 to the image sharing server 30, and the image sharing server 30 can transfer the frame to the first control device 10.

Specific Example

Figure 9:
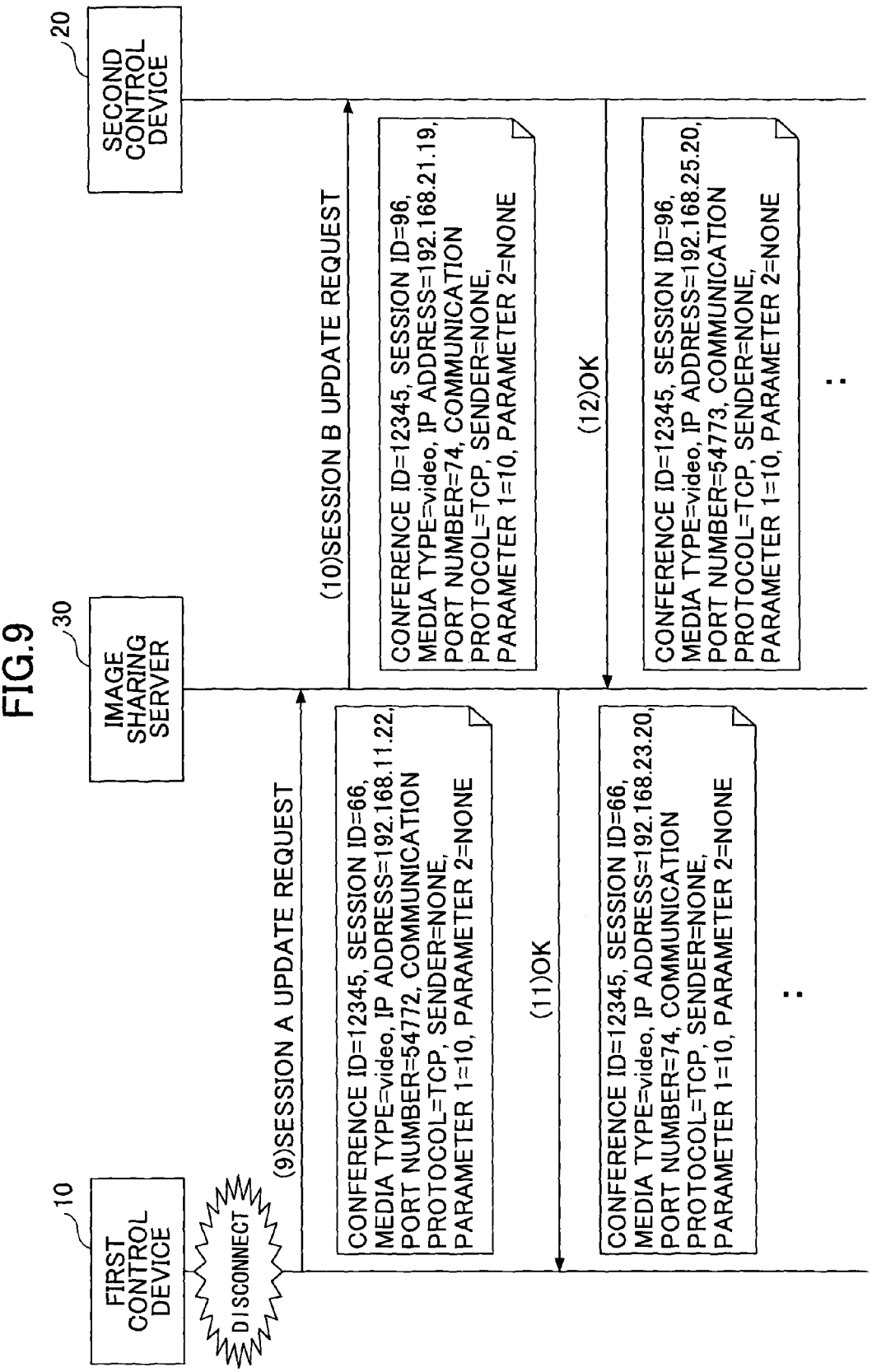
FIG. 9 is a sequence diagram of updating a session in the communication control system according to one embodiment.

FIG. 9 illustrates session information that is passed among devices when disconnecting a session in the communication control system 1 according to the present embodiment. When the first PC 50 is disconnected from the first control device 10, automatically, a request to update the session A is sent from the first control device 10 to the image sharing server 30 (FIG. 9 (9)). At this time, a remote conference ID "12345" and a session ID "66" indicating session A are sent.

The other session information complies with the communication protocol of RFC 3261 or RFC 3264. When the information defines that "communication protocol=TCP, sender=none", it means that the communication connection is updated and sending and receiving of frames are stopped.

In response to the request to update the session at (FIG. 9 (9)), a response of updating a session (sending stop OK) is sent from the image sharing server 30 to the first control device 10 (FIG. 9 (11)). At this time also, the remote conference ID "12345", the session ID "66", and the first control device ID as the connection destination information of the session A, are sent. The other session information indicated in (FIG. 9 (11)) is the same as that of (FIG. 9 (9)) and is thus not further described.

In response to the session update request of (FIG. 9 (9)), a session B is updated between the image sharing server 30 and the second control device 20. Specifically, a request to update the session B is sent from the image sharing server 30 to the second control device 20 (FIG. 9 (10)). At this time, the remote conference ID "12345" and the session ID "96" indicating the session B are sent.

The other session information complies with the communication protocol of RFC 3261 or RFC 3264. When the information defines that "communication protocol=TCP, sender=none", it means that the communication connection is updated and sending and receiving of frames are stopped.

In response to the request to the updating of the session B at (FIG. 9 (10)), a response of updating the session B (sending stop OK) is sent from the second control device 20 to the sharing server 30 (FIG. 9 (12)). At this time also, the remote conference ID "12345", the session ID "96", and the second control device ID as the connection destination information of the session B, are sent. The other session information indicated in (FIG. 9 (12)) is the same as that of (FIG. 9 (10)) and is thus not further described.

End of Communication

Lastly, the respective control devices end the session, so that the sharing of the PC screen is ended.

Specific Example

Figure 10:
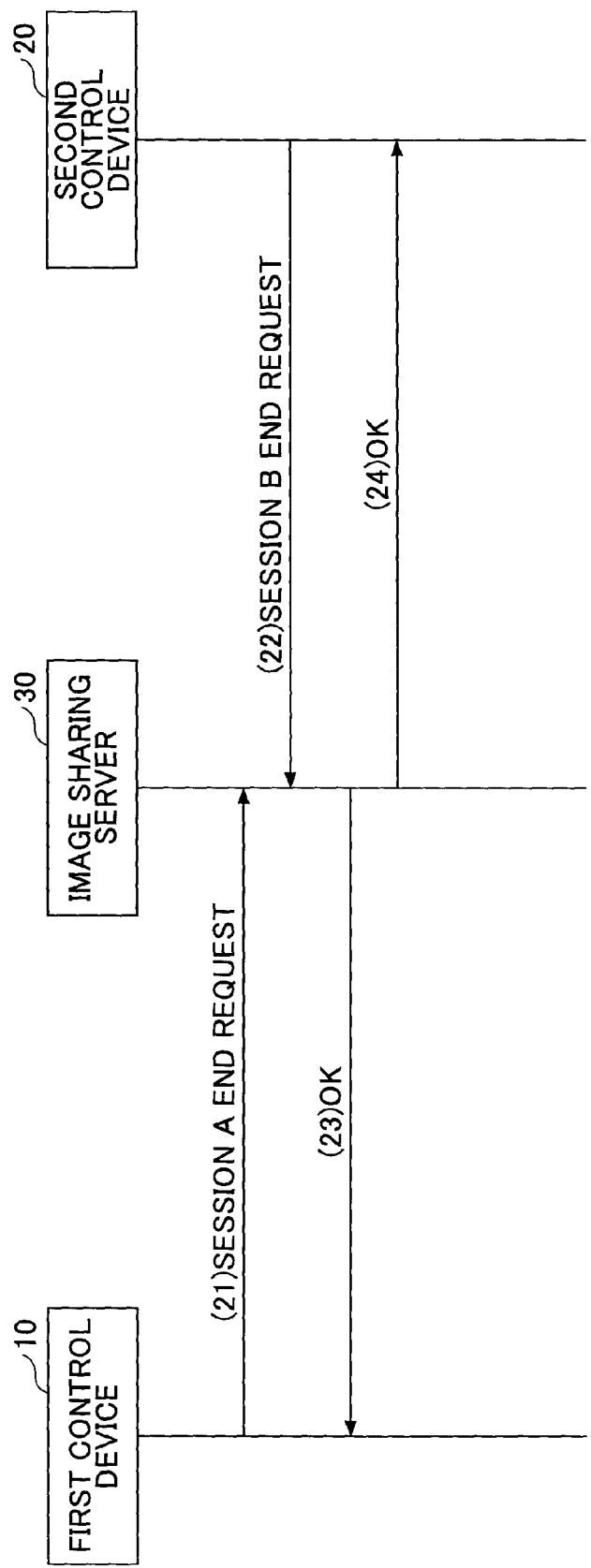
FIG. 10 is a sequence diagram of ending a session in the communication control system according to one embodiment.

FIG. 10 illustrates an example of session information passed among devices when ending a session in the communication control system 1 according to the present embodiment. When a request to end the session A is sent from the first control device 10 to the image sharing server 30 (FIG. 10 (21)), in response to this request, a response of ending the session A (sending end OK) is sent from the image sharing server 30 to the first control device 10 (FIG. 10 (23)).

Furthermore, according to (FIG. 10 (21)), when a request to end the session B is sent from the image sharing server 30 to the second control device (FIG. 10 (22)), in response to this request, a response of ending the session B (sending end OK) is sent from the second control device 20 to the image sharing server 30 (FIG. 10 (24)).

Modification/Overall Configuration of Communication Control System

Figure 11:
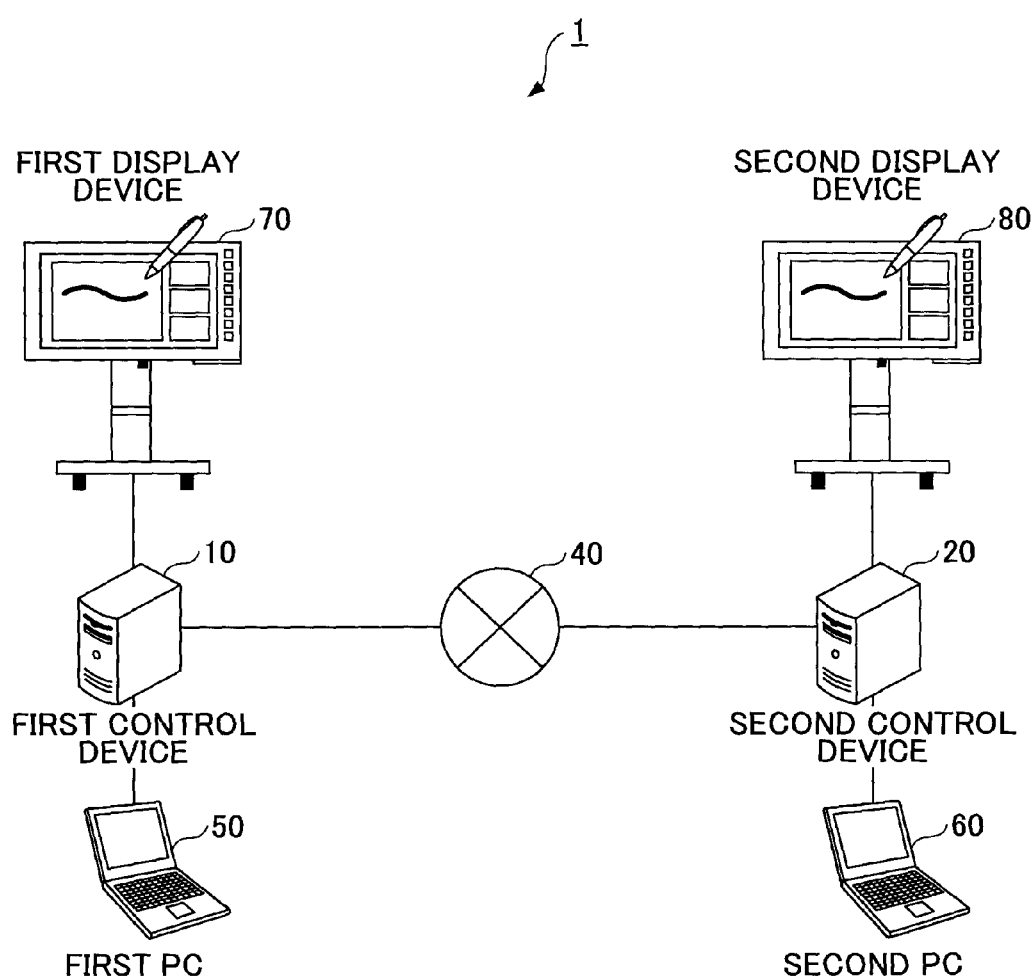
FIG. 11 illustrates an overall configuration of a communication control system according to a modification.

Next, a description is given of the overall configuration of the communication control system 1 according to a modification of the present invention, with reference to FIG. 11.

FIG. 11 illustrates the overall configuration of the communication control system according to a modification of the present invention.

When the interactive electronic whiteboards are in a one-on-one manner, the communication control system 1 can be realized without using an image sharing server. In this case, as indicated in the communication control system 1 according to the modification in FIG. 11, the control device directly sends a session start (update) request to the opposing control device without passing through an image sharing server. After a session is established, frames are directly sent to an opposing control device.

Also when the interactive electronic whiteboards are in a one-on-multiple manner, the communication control system 1 can be realized without using an image sharing server. In this case, a control device of a particular interactive electronic whiteboard functions as an image sharing server. In the control device of all interactive electronic whiteboards, it is manually set in advance that the above interactive electronic whiteboard will function as an image sharing server. Alternatively, when a conference management server is separately provided, the interactive electronic whiteboards may ask the conference management server which interactive electronic whiteboard is operating as an image sharing server.

As described above, the communication control system according to an embodiment of the present invention and a modification can simply and automatically display image data displayed on a display unit of a device connected to a first control device, on a second control device connected to the network. Accordingly, the operability for the user is improved.

In the communication control system according to an embodiment of the present invention and a modification, the call control may be implemented by using communication protocols such as Session Initiation Protocol (SIP) and Extensible Messaging and Presence Protocol (XMPP).

The communication control system and the control device are not limited to the specific embodiments described herein, and variations and modifications may be made by those skilled in the art without departing from the scope of the present invention.

The first control device, the second control device, and the server according to an embodiment of the present invention may be realized as a CPU (Central Processing Unit) operates according to a program stored in a storage unit (not shown). This program may be provided by being stored in a recording medium and loaded in the storage unit via a driver (not shown), or may be downloaded from a network (not shown) and stored in the storage unit. Furthermore, in order to realize the functions of the above units, a DSP (Digital Signal Processor) may be used instead of a CPU. The storage unit is realized by a RAM (Random Access Memory) or a ROM (Read-Only Memory). Furthermore, the functions of the first control device, the second control device, and the server according to an embodiment of the present invention may be realized by operations using software, or may be realized by operations using hardware.

According to an embodiment of the present invention, image data displayed on a display unit of a device connected to a first control device can be simply and automatically displayed by a second control device connected to a network.

The present application is based on Japanese Priority Application No. 2012-061247 filed on Mar. 16, 2012 with the Japan Patent Office, the entire contents of which are hereby incorporated by reference.

The invention claimed is:

1. A communication control system comprising:
a first control device;
a second control device, wherein the first control device and the second control device are grouped together by group identification information;
a determining unit configured to determine whether a device has been connected to the first control device or the second control device;
a detecting unit configured to detect acquisition of image data displayed on a display unit of the device determined as being connected by the determining unit;
a first communication control unit configured to establish a session for performing data communication with the second control device identified by the group identification information, and send the image data, when the device is determined as being connected by the determining unit;
a display control unit configured to implement control to display the image data sent from the first communication control unit;
a first session establishing unit configured to establish a first session for performing data communication with the first control device, and assign first session identification information to the first session;
a second session establishing unit configured to establish a second session for performing data communication with the second control device, and assign second session identification information to the second session;
a receiving unit configured to receive the image data sent from the first control device when the first session to which the first session identification information is assigned is established; and
a sending unit configured to send the image data to the second control device when the second session to which the second session identification information is assigned is established.

2. The communication control system according to claim 1, further comprising:
an image processing unit configured to acquire the image data displayed on the display unit and implement control to display the acquired image data, wherein
the display control unit outputs the image data displayed on the display unit to a display device, based on the image data sent from the first communication control unit.

3. The communication control system according to claim 1, wherein
the first communication control unit sends a frame that is generated by compressing the image data.

4. The communication control system according to claim 1, further comprising:
a processing unit configured to convert the received image data with the use of image information for converting the image data into a format for displaying the image data on a display device on a side of the second control device, wherein
the receiving unit receives the image data and the image information, and
the sending unit sends the image data that has been converted to the second control device.

5. The communication control system according to claim 4, wherein
the first session establishing unit, the second session establishing unit, the sending unit, and the processing unit are executed by a server connected to the first control device and the second control device as functions included in the server.

6. The communication control system according to claim 1, wherein
the detecting unit detects that the image data is not displayed on the display unit connected to the first control device,
the first communication control unit requests to update a session associated with the second control device, and
the second control device updates a session associated with the first control device.

7. The communication control system according to claim 1, wherein
the detecting unit detects that the image data is not displayed on the display unit connected to the first control device,
the first communication control unit requests to update the first session identified by the first session identification information,
the first session establishing unit updates the first session identified by the first session identification information,
the second session establishing unit requests to update the second session identified by the second session identification information,
the second control device updates the second session identified by the second session identification information, and
the first communication control unit stops sending the image data.

8. A control device connected to an information processing device that is grouped together with another information processing device by group identification information, the control device comprising:
a detecting unit configured to detect image data displayed on a display unit;
a first communication control unit configured to establish a session for performing data communication with the information processing device identified by group identification information, and send the image data;
a first session establishing unit configured to establish a first session for performing data communication with the information processing device, and assign first session identification information to the first session;
a second session establishing unit configured to establish a second session for performing data communication with the other information processing device, and assign second session identification information to the second session;
a receiving unit configured to receive the image data sent from the information processing device when the first session to which the first session identification information is assigned is established; and
a sending unit configured to send the image data to the other information processing device when the second session to which the second session identification information is assigned is established.

9. A non-transitory computer-readable recording medium storing a program for displaying image data sent from a control device connected to an information processing device that is grouped together with another information processing device by group identification information, wherein the program causes a computer to execute a process comprising:
detecting the image data displayed on a display unit;
establishing a session for performing data communication with the information processing device identified by group identification information;
sending the image data;
establishing a first session for performing data communication with the information processing device, and assign first session identification information to the first session;
establishing a second session for performing data communication with the other information processing device, and assign second session identification information to the second session;
receiving the image data sent from the information processing device when the first session to which the first session identification information is assigned is established; and
sending the image data to the other information processing device when the second session to which the second session identification information is assigned is established.

* * * * *